US010693839B2

(12) United States Patent
Cleaver et al.

(10) Patent No.: US 10,693,839 B2
(45) Date of Patent: Jun. 23, 2020

(54) DIGITAL MEDIA CONTENT DISTRIBUTION BLOCKING

(71) Applicant: INTERNATIONAL BUSINESS MACHINES CORPORATION, Armonk, NY (US)

(72) Inventors: James D. Cleaver, Grose Wold (AU); Sean R. Costello, Leichhardt (AU); Stefan Harrer, Hampton (AU); Laurence J. Plant, North Baldwyn (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/238,739

(22) Filed: Jan. 3, 2019

(65) Prior Publication Data

US 2019/0141014 A1   May 9, 2019

Related U.S. Application Data

(63) Continuation of application No. 15/467,098, filed on Mar. 23, 2017, now Pat. No. 10,230,690.

(51) Int. Cl.
*H04L 29/06* (2006.01)
*G06F 21/10* (2013.01)
(Continued)

(52) U.S. Cl.
CPC .......... *H04L 63/0245* (2013.01); *G06F 21/10* (2013.01); *G06F 21/552* (2013.01);
(Continued)

(58) Field of Classification Search
None
See application file for complete search history.

(56) References Cited

U.S. PATENT DOCUMENTS 6,324,647 B1   11/2001   Bowman-Amuah
6,671,818 B1 *   12/2003   Mikurak ............... G06Q 10/06
                                                                714/4.21
(Continued)

FOREIGN PATENT DOCUMENTS

WO   2016085412   6/2016

OTHER PUBLICATIONS

Imaizumi, Shoko et al. Hierarchical Key Assignment Scheme for Multimedia Access Control with Modified Hash Chain. 2012 Eighth International Conference on Intelligent Information Hiding and Multimedia Signal Processing. https://ieeexplore.ieee.org/stamp/stamp.jsp?tp=&arnumber=6274238 (Year: 2012).*
Wang, Yulin et al. Usage Control Based on Windows Kernel Hook. 2009 International Conference on Information and Multimedia Technology. https://ieeexplore.ieee.org/stamp/stamp.jsp?tp=&arnumber=5381203 (Year: 2009).*
(Continued)

*Primary Examiner* — Jeremiah L Avery
(74) *Attorney, Agent, or Firm* — Schmeiser, Olsen & Watts; Mark C. Vallone

(57) ABSTRACT

A method and system for improving a digital media content transfer blocking process is provided. The method includes detecting a request for access to digital media content from a digital media provider system. Network traffic across the network is identified and it is verified that the digital media content is comprised by the network traffic. In response, investigation platform software code is executed and a database system associated with the digital media provider system is queried. A system determines if a legitimate connection based relationship exists between a user device and the digital media provider system and the digital media content is monitored. The digital media content is determined to be unauthorized for use by the user and in response the digital media content is disabled from executing functions with respect to the user device of a user.

20 Claims, 7 Drawing Sheets

(51) Int. Cl.
| | | |
|---|---|---|
| *G06F 21/55* | (2013.01) | |
| *G06F 21/57* | (2013.01) | |
| *H04L 29/08* | (2006.01) | |
| *G06F 21/60* | (2013.01) | |
| *G06F 21/62* | (2013.01) | |

(52) U.S. Cl.
CPC .......... *G06F 21/577* (2013.01); *G06F 21/604* (2013.01); *G06F 21/6227* (2013.01); *H04L 63/0428* (2013.01); *H04L 63/10* (2013.01); *H04L 67/10* (2013.01)

(56) References Cited

U.S. PATENT DOCUMENTS

| | | | | |
|---|---|---|---|---|
| 7,213,047 | B2 | 5/2007 | Yeager | |
| 7,735,116 | B1* | 6/2010 | Gauvin | G06F 21/552 713/153 |
| 7,761,910 | B2* | 7/2010 | Ransom | G06F 1/28 726/6 |
| 9,608,809 | B1* | 3/2017 | Ghetti | H04L 9/083 |
| 2002/0141584 | A1 | 10/2002 | Razdan | |
| 2003/0097564 | A1* | 5/2003 | Tewari | H04L 12/14 713/171 |
| 2003/0105976 | A1* | 6/2003 | Copeland, III | G06F 21/552 726/4 |
| 2005/0015624 | A1* | 1/2005 | Ginter | G06F 21/55 726/4 |
| 2006/0020814 | A1* | 1/2006 | Lieblich | G06F 21/316 713/182 |
| 2008/0021834 | A1 | 1/2008 | Holla | |
| 2008/0059216 | A1 | 3/2008 | Fromentoux | |
| 2009/0024634 | A1* | 1/2009 | Harrang | H04L 1/0038 |
| 2010/0217837 | A1* | 8/2010 | Ansari | H04L 12/2818 709/218 |
| 2010/0274872 | A1* | 10/2010 | Harrang | H04L 1/0002 709/217 |
| 2013/0291060 | A1 | 10/2013 | Moore | |
| 2014/0020083 | A1* | 1/2014 | Fetik | G06F 21/552 726/11 |
| 2014/0201838 | A1* | 7/2014 | Varsanyi | G06F 21/552 726/23 |
| 2014/0280952 | A1 | 9/2014 | Shear | |
| 2016/0021181 | A1 | 1/2016 | Ianakiev | |
| 2016/0092639 | A1 | 3/2016 | Padmani | |
| 2016/0099963 | A1* | 4/2016 | Mahaffey | H04L 63/0227 726/25 |
| 2017/0289191 | A1* | 10/2017 | Thioux | H04L 63/1441 |
| 2018/0278582 | A1 | 9/2018 | Cleaver | |

OTHER PUBLICATIONS

Chen, Ching-Wei et al. Content Identification in Consumer Applications. 2009 IEEE International Conference on Multimedia and Expo. https://ieeexplore.ieee.org/stamp/stamp.jsp?tp=&arnumber=5202797 (Year: 2009).*

Eskicioglu, Ahmet M. New Channels for Carrying Copyright and Usage Rights Data in Digital Multimedia Distribution. International Conference on Information Technology: Research and Education, 2003. Proceedings, ITRE2003. https://ieeexplore.ieee.org/stamp/stamp.jsp?tp=&arnumber=1270580 (Year: 2003).*

Ma, Liran et al. A Hybrid Rogue Access Point Protection Framework for Commodity Wi-Fi Networks. IEEE INFOCOM 2008—The 27th Conference on Computer Communications. https://ieeexplore.ieee.org/stamp/stamp.jsp?tp=&arnumber=4509773 (Year: 2008).*

Islam, Muhammad Mahmudul et al. An Intrusion Detection System for Suburban Ad-hoc Networks. TENCON 2005-2005 IEEE Region 10 Conference. https://ieeexplore.ieee.org/stamp/stamp.jsp?tp=&arnumber=4085224 (Year: 2005).*

Chen, Hua et al.; Distributed Opportunistic Scheduling for Wireless Ad-Hoc Networks with Block-Fading Model. IEEE Journal on Selected Areas in Communications, vol. 31, Issue: 11; Nov. 2013; pp. 2324-2337.

Friedman, Mark J.; List of IBM Patents or Patent Applications Treated as Related; Jan. 3, 2019; 1 page.

Gupta, Manav et al.; Cyber Threat Intelligence; IBM Case Study; Jun. 29, 2015; 31 pages.

Hopewell, Luke; Telstra to Trial Throttling, Packet Inspection to Stop Piracy; Retrieved from the Internet Nov. 13, 2016; URL: https://www.gizmodo.com.au/2013/02/telstra-to-trial-throttling-packet-inspection-to-stop-piracy/; 14 pages.

Mateus, Alexandre M.; Dimensions of P2P and digital piracy in a university campus; Proceedings of 2008 Telecommunications Policy Research Conference; Sep. 2008; 37 pages.

Meerja, Khalim Amjad et al.; A Novel Architecture and Media Access Protocol for Cognitive Radio based Autonomous Femtocell Networks; 2013 Tenth International Conference on Wireless and Optical Communications Networks (WOCN); Jul. 26-28, 2013; 5 pages.

Ockenden, Will; Village Roadshow launches legal action to block piracy-related website in Australia; The World Today; Feb. 17, 2016; 2 pages.

Robinson, Matthew, et al.; Software Defined Networking for Heterogeneous Access Networks; 2016 18th International Conference on Transparent Optical Networks (ICTON); Jul. 10-14, 2016; 4 Pages.

* cited by examiner

DIGITAL MEDIA CONTENT DISTRIBUTION BLOCKING

CROSS REFERENCE TO RELATED APPLICATIONS

This application is a continuation application claiming priority to Ser. No. 15/467,098 filed Mar. 23, 2017, now U.S. Pat. No. 10,230,690, issued Mar. 12, 2019, the contents of which are hereby incorporated by reference.

FIELD

The present invention relates generally to a method for blocking unauthorized content and in particular to a method and associated system for disabling a distribution of unauthorized digital media content between devices.

BACKGROUND

Processes for preventing unauthorized media replication are well known. A large number of solutions currently exist with respect to targeting Websites by blocking domain name services (DNS) that map to the Websites and associated IP addresses. A DNS blocking process prevents a server from converting a domain name into an IP address thereby preventing a user from accessing a website. Additionally, a DNS blocking process comprises a simplified method for blocking Website access for distribution access. Alternative current solutions for preventing unauthorized media replication may include a deep packet inspection process to monitor data packets of associated content in motion and a process for enabling a search for patterns and compromises within massive amounts of structured and unstructured data.

However, the aforementioned solutions may enable an unintentional blocking process with respect to valid Websites and/or IP addresses associated with similar domain names. Additionally, the aforementioned solutions may not be enabled to identify content of various types of media.

Accordingly, there exists a need in the art to detect and validate content thereby allowing a quick and accurate determination of a validity of the content with respect to access rights.

SUMMARY

A first aspect of the invention provides an Internet based digital media content transfer blocking improvement method comprising: detecting, by a processor of a detection hardware device, a user request, from a user device for access to digital media content from a digital media provider system; detecting, by the processor, the digital media content being transmitted from the digital media provider system to a network; identifying, by the processor executing a network hardware probe of the detection hardware device, network traffic across the network; executing, by the processor, an analytical software engine of the detection hardware device; verifying, by the processor executing the analytical software engine, that the digital media content is comprised by the network traffic; executing, by the processor in response to results of verifying, investigation platform software code; querying, by the processor, a database system associated with the digital media provider system; determining, by the processor based on results of the querying, if a legitimate connection based relationship exists between the user and the digital media provider system; monitoring, by the processor, the digital media content; additionally determining, by the processor based on results of the monitoring, that the digital media content is not authorized for use by the user; and disabling, by the processor based on the determining that the digital media content is not authorized for use by the user, the digital media content from executing functions with respect to the user device of the user.

A second aspect of the invention provides a computer program product, comprising a computer readable hardware storage device storing a computer readable program code, the computer readable program code comprising an algorithm that when executed by a processor of a detection hardware device implements an Internet based digital media content transfer blocking improvement method, the method comprising: detecting, by the processor, a user request from a user device for access to digital media content from a digital media provider system; detecting, by the processor, the digital media content being transmitted from the digital media provider system to a network; identifying, by the processor executing a network hardware probe of the detection hardware device, network traffic across the network; executing, by the processor, an analytical software engine of the detection hardware device; verifying, by the processor executing the analytical software engine, that the digital media content is comprised by the network traffic; executing, by the processor in response to results of verifying, investigation platform software code; querying, by the processor, a database system associated with the digital media provider system; determining, by the processor based on results of the querying, if a legitimate connection based relationship exists between the user and the digital media provider system; monitoring, by the processor, the digital media content; additionally determining, by the processor based on results of the monitoring, that the digital media content is not authorized for use by the user; and disabling, by the processor based on the determining that the digital media content is not authorized for use by the user, the digital media content from executing functions with respect to the user device of the user.

A third aspect of the invention provides a detection hardware device comprising a processor coupled to a computer-readable memory unit, the memory unit comprising instructions that when executed by the computer processor implements an Internet based digital media content transfer blocking improvement method comprising: detecting, by the processor, a user request, from a user device, for access to digital media content from a digital media provider system; detecting, by the processor, the digital media content being transmitted from the digital media provider system to a network; identifying, by the processor executing a network hardware probe of the detection hardware device, network traffic across the network; executing, by the processor, an analytical software engine of the detection hardware device; verifying, by the processor executing the analytical software engine, that the digital media content is comprised by the network traffic; executing, by the processor in response to results of verifying, investigation platform software code; querying, by the processor, a database system associated with the digital media provider system; determining, by the processor based on results of the querying, if a legitimate connection based relationship exists between the user and the digital media provider system; monitoring, by the processor, the digital media content; additionally determining, by the processor based on results of the monitoring, that the digital media content is not authorized for use by the user; and disabling, by the processor based on the determining that the digital media content is not authorized for use by the user, the digital media content from executing functions with respect to the user device of the user.

The present invention advantageously provides a simple method and associated system capable of preventing unauthorized media replication.

DETAILED DESCRIPTION

Figure 1:
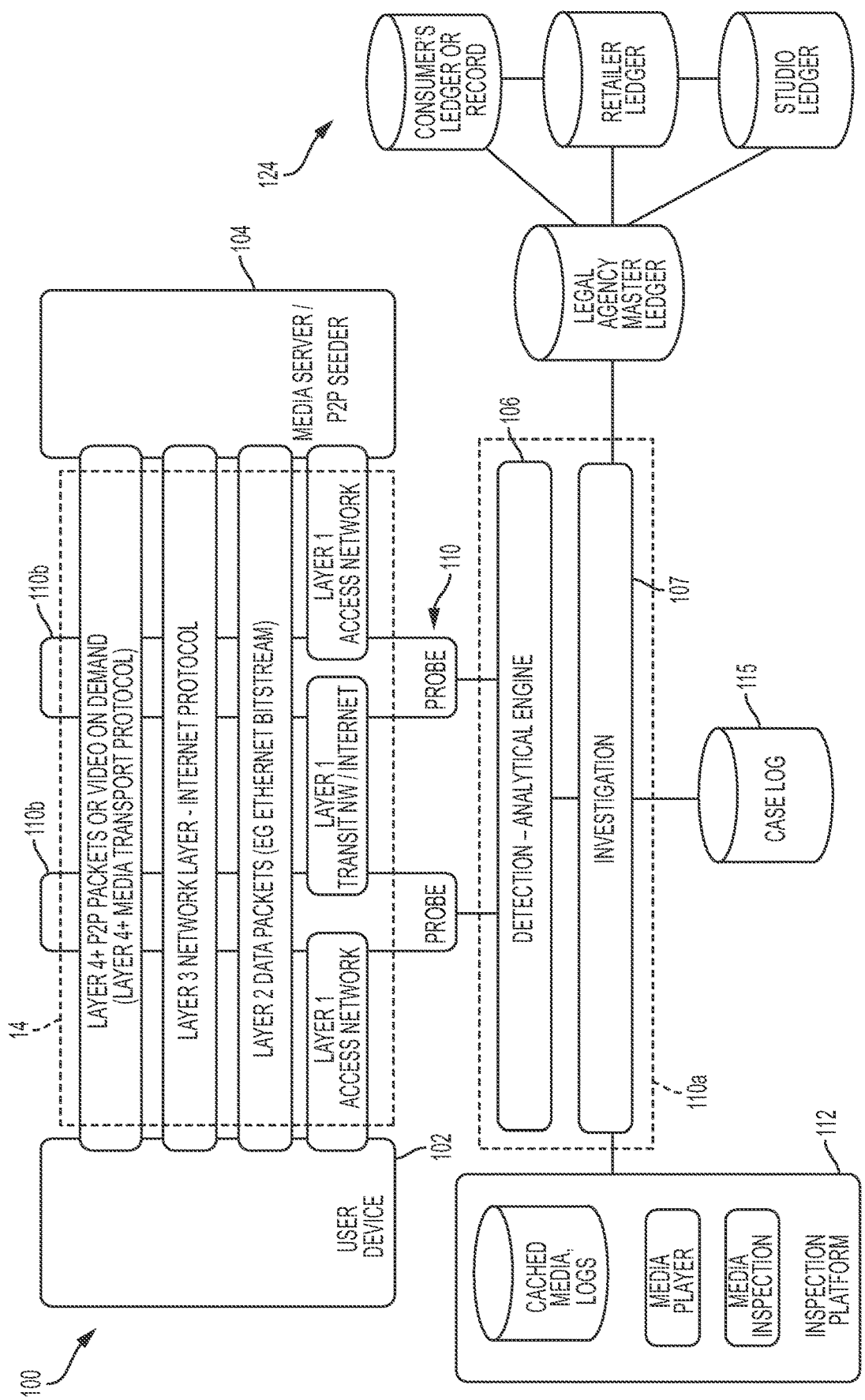
FIG. 1 illustrates a system for improving a digital media content transfer prevention process, in accordance with embodiments of the present invention.

FIG. 1 illustrates a system 100 for improving a digital media content transfer prevention process, in accordance with embodiments of the present invention. Typical media content transfer prevention processes may prevent a system from converting a domain name into an IP address thereby preventing a user from accessing a website. Alternatively, a deep packet inspection process may be unable to identify digital media content. For example, digital media data may be analyzed via usage of a streaming digital media analysis comprising deep packet inspection. The aforementioned process may include usage of multiple distributed stream computing platforms querying digital media data for patterns such that an analytical reference model is distributed across the multiple distributed stream computing platforms.

System 100 enables an improved process for blocking illicit and unauthorized digital media content (e.g., audio and/or video files, audio and/or video streams, text files such as e-books, etc.) in real time during transfer of the digital media content over a network 14. System 100 enables:

1. Usage of a network probe detection device 110b (in real time) during a digital media content transfer process to trigger an investigation with respect to suspicious digital media content transfers.
2. Access to a block chain enabled secure database (storing the digital media content) and involved user related information (parties involved, purchase history, transactions, etc.) databases, metadata, encryption keys, etc. via a centralized authority system to authenticate (the transfer) and/or halt/block the transfer process.

System 100 of FIG. 1 includes a user device 102, a media server 104, an inspection platform system 112, databases 124, and a case log database connected through a network 14 to a detection hardware device 110 comprising a network hardware probe 110b and a detection hardware module 110a. Detection hardware device 110 may comprise an embedded computer. An embedded computer is defined herein as a dedicated computer comprising a combination of computer hardware and software (fixed in capability or programmable) specifically designed for executing a specialized function. Programmable embedded computers may comprise specialized programming interfaces. Additionally, detection hardware device 110 may comprise a specialized hardware device comprising specialized (non-generic) hardware and circuitry (i.e., specialized discrete non-generic analog, digital, and logic based circuitry) for executing a process described with respect to FIGS. 1-8. The specialized discrete non-generic analog, digital, and logic based circuitry may include proprietary specially designed components (e.g., a specialized integrated circuit designed for only implementing an automated process for improving a digital media content transfer prevention process). Detection hardware device 110 includes a detection analytical engine and circuitry 106, an investigation analytical engine and circuitry 107, and a case log database memory 115. Case log database memory 115 may include a single memory system. Alternatively, case log database memory 115 may include a plurality of memory systems. Detection hardware device 110 may include sensors, processors, and additional software and specialized circuitry as further described, infra, with respect to FIG. 2. Sensors may include, inter alia, GPS sensors, digital media retrieval streaming sensors, network traffic sensors, etc. Network 14 may include any type of network including, inter alia, a local area network, (LAN), a wide area network (WAN), the Internet, a wireless network, etc.

Network 14 comprises a communication path between a digital media consumer and a digital media provider. Network 14 may include the following layers:

1. A network layer 1 including a physical network layer that includes access networks (e.g., cable, DSL, satellite, fiber, etc.) that connect to system locations and transport networks that connect the access networks to the Internet.
2. A network layer 2 including a data packet layer configured to transfer digital media data packets.
3. A network layer 3 including an IP (Internet Protocol) layer for providing addressing and additional services.
4. A network layer 4 including a set of protocols on top of the IP layer that support transferring the digital media content (e.g., streaming)

User device 102 comprises a physical device configured to stream or download audio or digital media content. For example, user device may comprise, inter alia, a set top box, an Internet connected TV, a smartphone, a tablet, a computer, etc. Alternatively, a user may enable a digital media file or stream via a media player. Media server/peer to peer seeder 104 may comprise a server for providing any type of authorized or unauthorized audio/digital media media for usage and viewing.

Network hardware probe 110b comprises a hardware appliances connected to network 14 for inspecting network traffic at the different network layers. Network hardware probe 110b may execute a deep packet inspection process. Network hardware probe(s) 110b may be placed at various points in network 14 (and additional networks) to inspect all network traffic associated with a jurisdiction thereby enabling an inspection process of the network.

Detection analytical engine and circuitry 106 enables hardware and software functions for ingesting data from Network hardware probe 110b and identifying network traffic for inspection. For example, detection analytical engine and circuitry 106 may identify a streaming digital media session or packets carrying digital media being downloaded and in response may trigger an investigation.

Investigation analytical engine and circuitry 107 enables hardware and software functions for coordinating identification of unauthorized digital media content. Investigation analytical engine and circuitry 107 invokes a master ledge system (of databases 124) in the domain of an authority charged with the responsibility of reducing unauthorized digital media content retrieval via retrieval of records of transactions from parties involved (e.g., reading the ledger of the digital media user and provider) to confirm that a legal transaction (e.g., a digital media service subscription) is in place. If a legal transaction is not located, system 100 may assume an unauthorized process is occurring. Additionally, if a legal transaction is in place, system 100 may request that an inspection platform system inspect a digital media to identify if there is unauthorized material or to confirm if the digital media being delivered matches a description in the legal transaction record (e.g., a user could be charged $x to receive a movie A but is instead being sent a copy of unauthorized movie B).

Master ledger system comprises a legal agency's record of all parties involved in a legal digital media service (e.g., a consumer, a digital media retailer (distributor), a digital media studio or owner, etc. The master ledger may be established via a hardware/software based information management and data synchronization process (master data management) or via each party providing a programmable interface (API) for querying.

An inspection platform system may include a hardware/software digital media analysis system inspecting a digital media file or stream to identify the digital media and determine if there is illicit content (e.g., similar to a way at which machine analysis of CCTV surveillance digital media can identify where and when luggage has been left behind). The above platform may be implemented via software based digital media analysis or microprocessor based digital media analysis (e.g., true north neurosynamptic microprocessors). Case log database system comprises a record of all investigations.

System 100 enables a process for recording digital media content usage transaction details in a secure database or ledger accessible by a legal agency. The ledger is configured to record details of the transaction including involved parties, meta data describing the digital media content, and encryption keys for decrypting the digital media content. Each party in a transaction may maintain their own ledger and make it accessible to the legal agency. Alternatively, the ledger may comprise a secure ledger shared by each party involved in the transaction (e.g., a ledger enabled by a block chain). System 100 enables network probes placed in Internet service provider networks to inspect network traffic as it passes across the network in real time and identify network traffic determined to be transferring digital media media content between IP addresses (e.g., P2P traffic). Network hardware probes are connected to (or embedded within) real time analytical engines/circuitry configured to trigger investigation algorithms to determine if an investigation is required. For example, an investigation of a digital media streamed from a newspaper public website is not likely to require an investigation but an investigation of P2P network traffic from a suspected unauthorized Website and user or encrypted P2P traffic between two users may trigger an investigation. The following factors may trigger investigation algorithms:

1. When a user's content or content purchase was last inspected.
2. A duration and volume of media being transferred.
3. If network traffic is passing between one or more unauthorized IP addresses.

Upon initiating the investigation, a legal agency (hardware/software system) may access ledgers associated with each IP address associated with the digital media content transfer and confirm if a legitimate purchase has been transacted. If the digital media content is covered by a proof of purchase, the legal agency (hardware system) may terminate the investigation or may inspect digital goods to detect illicit content. If the content is not encrypted, the legal agency may enable digital media and image analytics to inspect the digital goods and look for illicit content. If the digital goods are encrypted, the legal agency recovers and enables digital keys from the ledger to decrypt the digital media content before inspection. If the digital media content is not covered by a valid proof of purchase and the digital media content is not encrypted, the legal agency enables digital media and image analytics to inspect the content for illicit content by reconstructing the streaming digital media from digital packets executed by streaming media in a media player and using neural network-based digital media analytics system to inspect the streaming digital media and look for protected and illicit content. The neural network is hardware and software based and operates in a supervised mode and recursively learns detection options based on training. Subsequently, suspicious content is flagged for automated inspection and validation. If the content not covered by a proof of purchase is encrypted, the legal agency may automatically contact the party receiving the content and request digital keys. If the digital keys are provided, the legal agency may automatically inspect the content. If the digital keys are not provided, the legal agency may digitally halt or block the transfer or allow it to continue and log all data including the content for subsequent investigation.

Additionally, system 100 may analyze social networks to identify information associated with Websites and hardware/software tools facilitating unauthorized transactions. The analyses results may be used to direct real time analysis of network traffic patterns. For example, a process for identifying a suspected Website and subsequently downloading tools from or transferring content from the IP address associated with the suspected Website. System 100 enables a real time interception and analysis of content in motion process to detect and halt illicit content retrieval by inspecting a proof of purchase and integrating a digital media media file with decryption keys and a central registry.

The following example describes an implementation scenario for determining that an unauthorized digital media media file has been accessed as follows:

A user (James) returns home from a long evening at work and powers up his Internet-connected TV to watch a show A. James is unable to locate the show A via known Websites and therefore he locates an unfamiliar Website to watch the show A. In response, a network hardware probe intercepts digital media packets (of show A) and a detection analytical engine and circuitry device determines that the network traffic comprises digital media and the serving website is a new and unknown Website thereby triggering an investigation. An associated investigation analytical engine and circuitry device is executed and is unable to locate any record of the new website in its block chain. Additionally, the investigation analytical engine and circuitry device determines that the show A comprises a rights-protected TV show and therefore the investigation analytical engine and circuitry device instructs the network hardware probes to block network traffic. In response, James determines that he can no longer access the Website so he attempts to use a P2P (e.g., bit torrent) client to download an unauthorized copy of show A from an unauthorized Website (e.g., seeder in P2P terminology). The associated investigation analytical engine and circuitry device detects the request is P2P network traffic and determines that the digital media packets are from a copyright protected digital media and therefore instructs the network hardware probes to block the network traffic. Additionally, authorities are notified.

The following example describes an implementation scenario for determining that an authorized digital media media file has been accessed as follows:

A user (Rory) uses his tablet to retrieve and watch a digital media file stored in a network drive. In response, network hardware probes intercept digital media packets (of the digital media file) and a detection analytical engine and circuitry device determines that the network traffic comprises digital media and that the digital media file is being retrieved from a network drive thereby triggering an investigation. Subsequently, investigation analytical engine and circuitry device determines that it is unable to locate any record of the network drive in its block chain and therefore the digital media file is inspected. Upon identifying that the digital media file does not include content to be protected, no action is executed. Subsequently, Rory enables a digital media from a subscription based Website and the system again detects a new digital media session but confirms from its block chain that there is a valid subscription in place and therefore no further action is taken.

Figure 2:
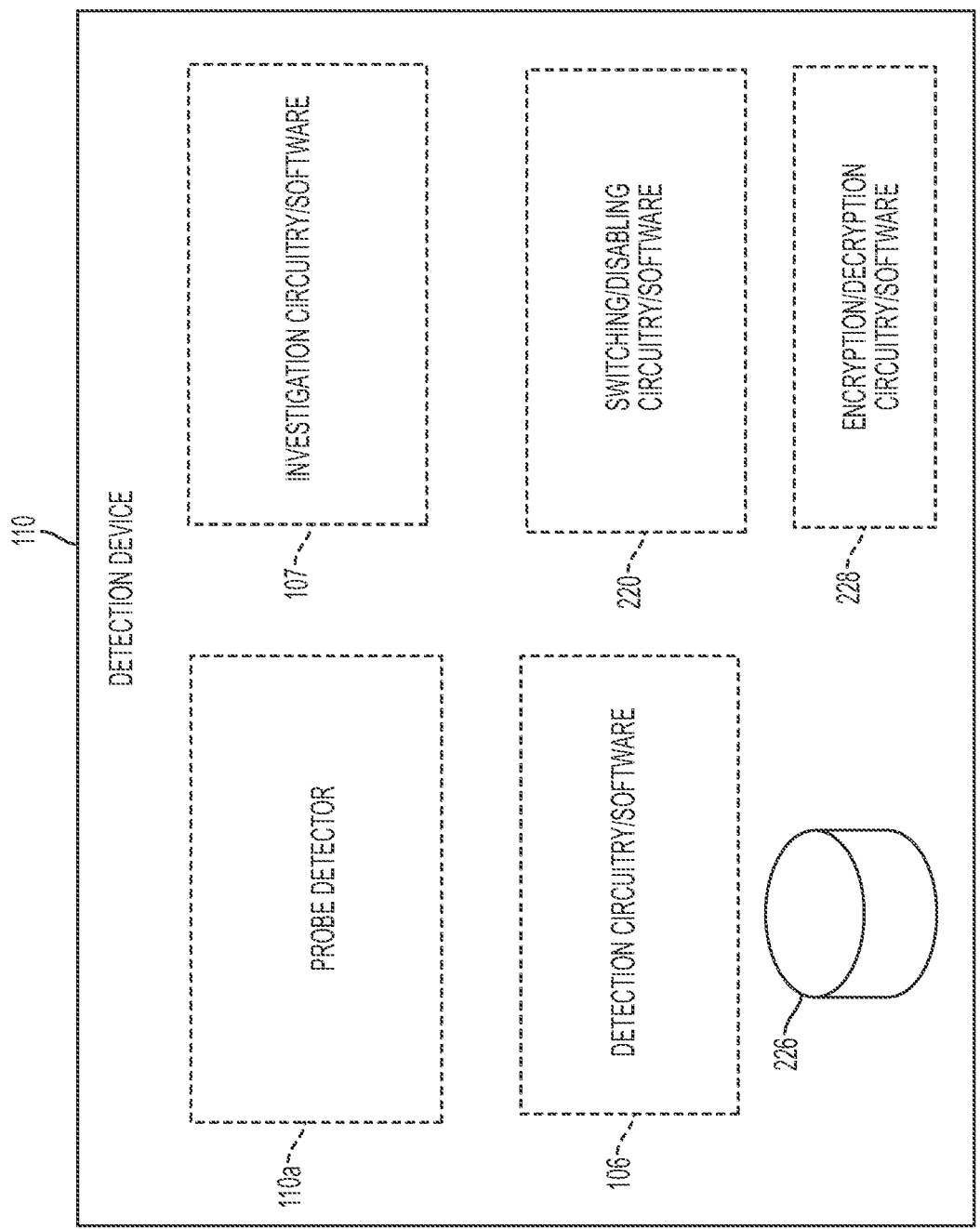
FIG. 2 illustrates a detailed view of the detection hardware device of FIG. 1, in accordance with embodiments of the present invention.

FIG. 2 illustrates a detailed view of detection hardware device 110 of FIG. 1, in accordance with embodiments of the present invention. Detection hardware device 110 comprises detection hardware module 110a, network hardware probe 110b, detection analytical engine and circuitry 106, investigation analytical engine and circuitry 107, Switching/disabling circuitry/software 220, encryption/decryption circuitry/software 228, and database/storage device 226 communicatively connected to each other. The following process is enabled by detection hardware device 110 upon detection of a streaming or enabled digital media file:

Network hardware probe 110b identifies network traffic and invokes and enables detection analytical engine and circuitry 106. In response, detection analytical engine and circuitry 106 recognizes the network traffic as digital media and invokes investigation analytical engine and circuitry 107 such that a block chain is queried to determine if a legitimate relationship exists between a digital media supplier and user. Additionally, investigation analytical engine and circuitry 107 monitors the digital media for illicit content to confirm that the digital media being streamed comprises a digital media that has been acquired under a legitimate transaction. If the digital media is determined to be acquired via an unauthorized means then switching disabling circuitry 220 may direct the network hardware probe 110b to block all network traffic. Alternatively, if the digital media is determined to be acquired via an unauthorized means then encryption/decryption circuitry/software 228 may encrypt the digital media file to prevent usage. All actions may be logged via database/storage device 226.

Figure 3:
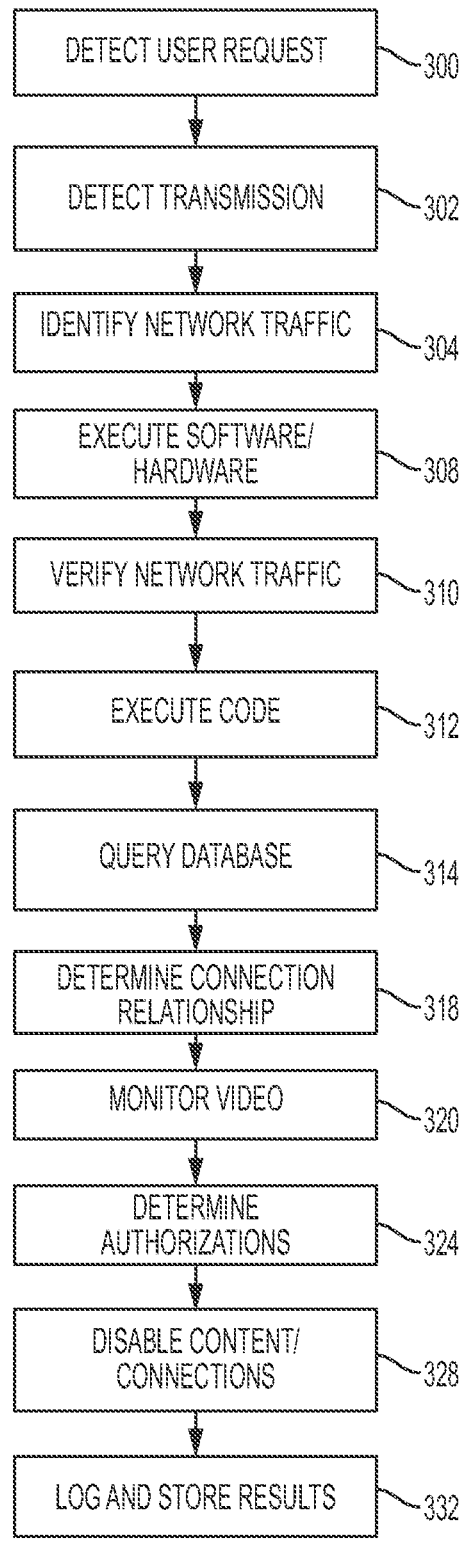
FIG. 3 illustrates an algorithm detailing a process flow enabled by the system of FIG. 1 for improving a digital media content transfer prevention process, in accordance with embodiments of the present invention.

FIG. 3 illustrates an algorithm detailing a process flow enabled by system 100 of FIG. 1 for improving a digital media content transfer prevention process, in accordance with embodiments of the present invention. Each of the steps in the algorithm of FIG. 3 may be enabled and executed in any order by a computer processor(s) executing computer code. In step 300, a user request (from a user device) is detected (by a detection hardware device) for access to digital media content from a digital media provider system. In step 302, the content being transmitted from the digital media provider system to a network is detected. In step 304, network traffic across the network is identified via a network hardware probe of the detection hardware device. In step 308, an analytical software and hardware engine of the detection hardware device is executed. In step 310, it is verified that the digital media content is comprised by the network traffic. The verification may include ingesting the digital media content from the network probe and inspecting the ingested digital media content. In step 312, investigation platform software code is executed. In step 314, a database system associated with the digital media provider system is queried. In step 318, it is determined (based on results of step 314) if a legitimate connection based relationship exists between the user and the digital media provider system. In step 320, the digital media content is monitored. In step 324, it is determined (based on results of step 320) that the digital media content is not authorized for use by the user. In step 320, the digital media content is disabled from executing functions with respect to the user device of the user. For example, the digital media content may be blocked from reaching the user device. Alternatively, disabling the digital media content may include detecting a location of the user device; disabling a network connection to the user device; and notifying an authority system that the digital media content is not authorized for use by the user. Alternatively, the digital media content may include encrypted digital media content such that a request for providing a decrypt key associated with decrypting the encrypted digital media content for the user device is transmitted and it is determined that a specified period of time has elapsed since the transmission. In response, it is determined that the decrypt key has not been received by the user device and disabling the digital media content is based on not receiving the decrypt key. In step 332, all results are logged and stored.

Figure 4:
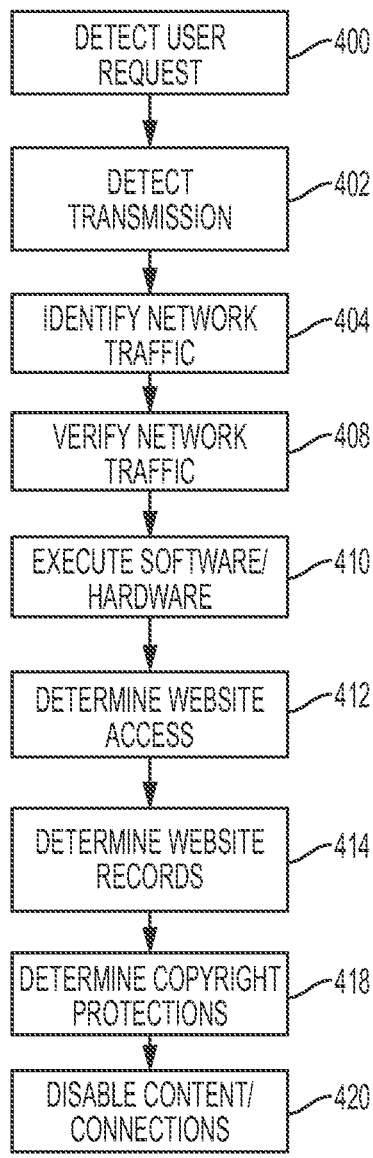
FIG. 4 illustrates an alternative algorithm to the algorithm of FIG. 3 detailing an alternative process flow enabled by the system of FIG. 1 for improving a digital media content transfer prevention process, in accordance with embodiments of the present invention.

FIG. 4 illustrates an alternative algorithm to the algorithm of FIG. 3 detailing an alternative process flow enabled by system 100 of FIG. 1 for improving a digital media content transfer prevention process, in accordance with embodiments of the present invention. Each of the steps in the algorithm of FIG. 4 may be enabled and executed in any order by a computer processor(s) executing computer code. In step 400, a user request (from a user device) is detected (by a detection hardware device) for access to digital media content from a digital media provider system. In step 402, the content being transmitted from the digital media provider system to a network is detected. In step 404, network traffic across the network is identified via a network hardware probe of the detection hardware device. In step 408, it is verified that the digital media content is comprised by the network traffic. In step 410, investigation platform software code is executed based on results of step 408. In step 412, it is determined that a Website of the digital media provider system has not been previously accessed by the user. In step 414, it is determined that a record of the Website does not exist with respect to any accounts of the user. In step 418, it is determined that that the digital media content comprises copyright protected data. In step 420, digital media content is disabled from executing functions with respect to the user device of the user based on results of steps 412, 414, and 418. For example, the digital media content may be blocked from reaching the user device. Alternatively, disabling the digital media content may include detecting a location of the user device; disabling a network connection to the user device; and notifying an authority system that the digital media content is not authorized for use by the user. Alternatively, the digital media content may include encrypted digital media content such that a request for providing a decrypt key associated with decrypting the encrypted digital media content for the user device is transmitted and it is determined that a specified period of time has elapsed since the transmission. In response, it is determined that the decrypt key has not been received by the user device and disabling the digital media content is based on not receiving the decrypt key.

Figure 5:
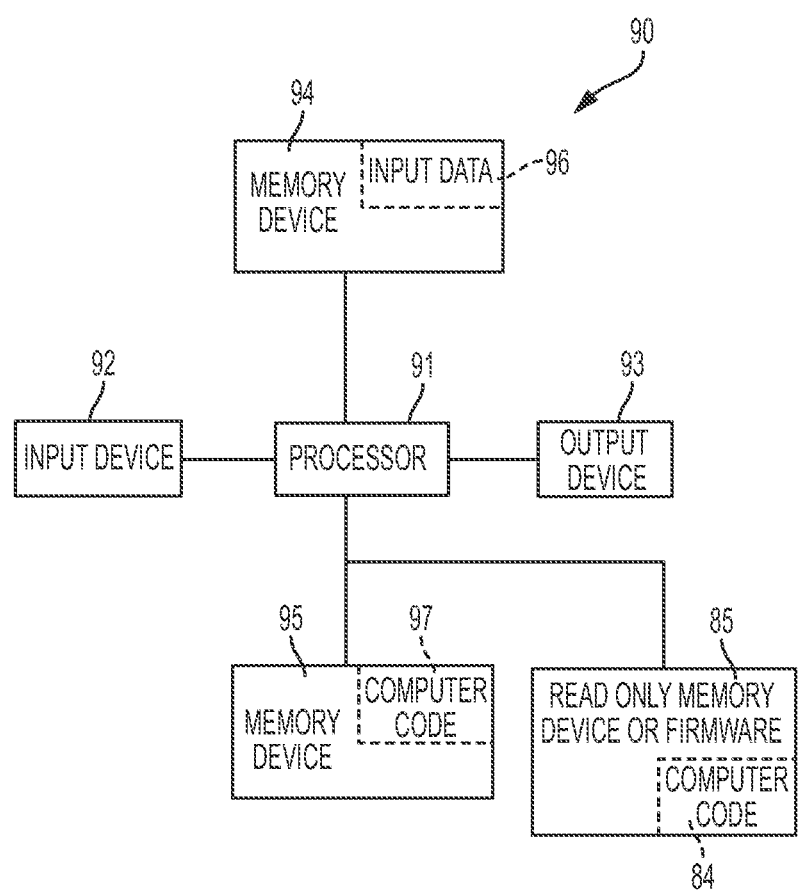
FIG. 5 illustrates a computer system used by the systems of FIG. 1 for improving a digital media content transfer prevention process, in accordance with embodiments of the present invention.

FIG. 5 illustrates a computer system 90 (e.g., detection hardware device 110) used by or comprised by the system of FIG. 1 for improving a digital media content transfer prevention process, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital media disc (DVD), a dynamic random access memory (DRAM), a read-only memory (ROM), etc. The memory device 95 includes a computer code 97. The computer code 97 includes algorithms (e.g., the algorithms of FIGS. 3 and 4) for enabling a process for improving a digital media content transfer prevention process. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithms of FIGS. 3 and 4) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithm) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve a digital media content transfer prevention process. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for determining a predicted future state and associated operational attributes for a hardware system. In another embodiment, the invention provides a business method that performs the process steps of the invention on a subscription, advertising, and/or fee basis. That is, a service supplier, such as a Solution Integrator, could offer to enable a process for improving a digital media content transfer prevention process. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
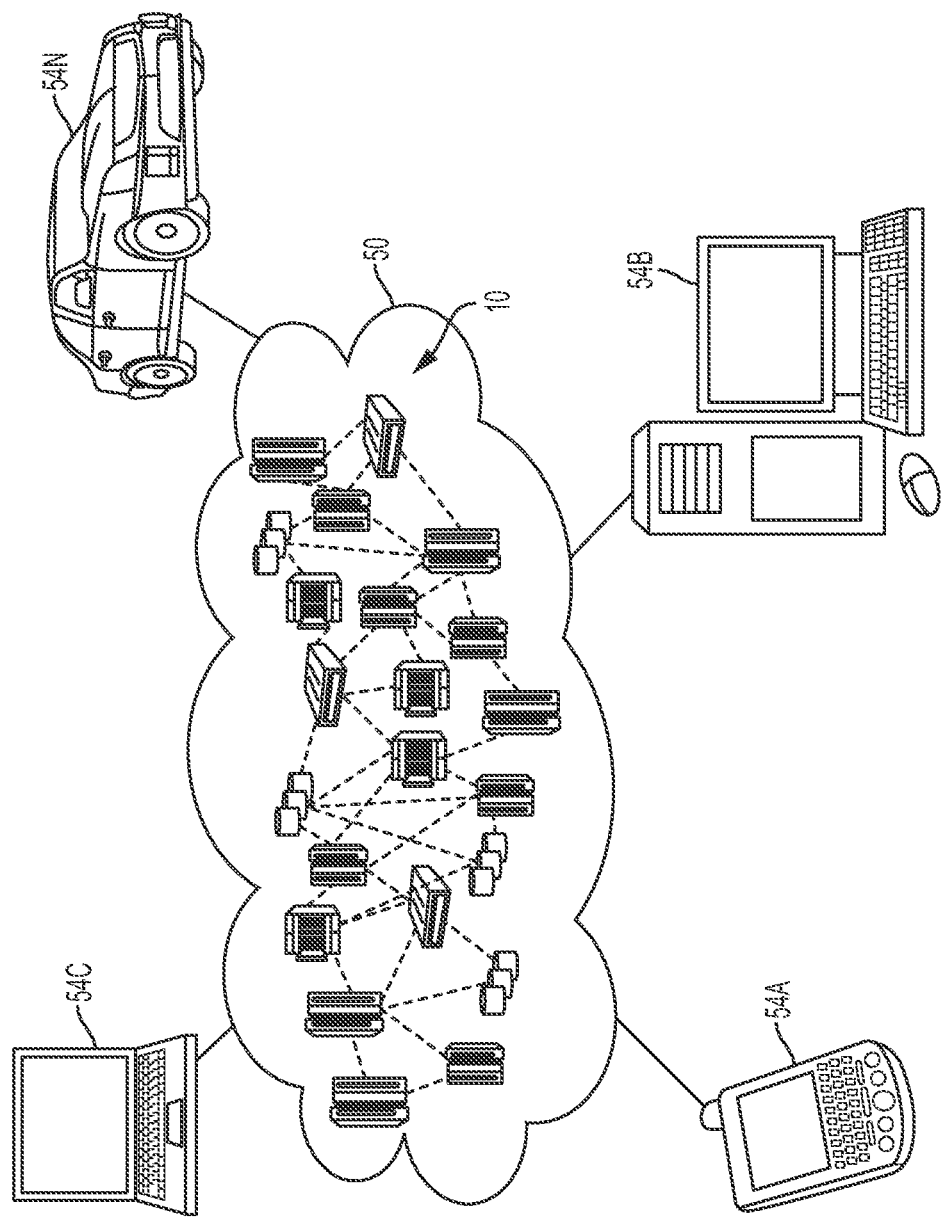
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 7:
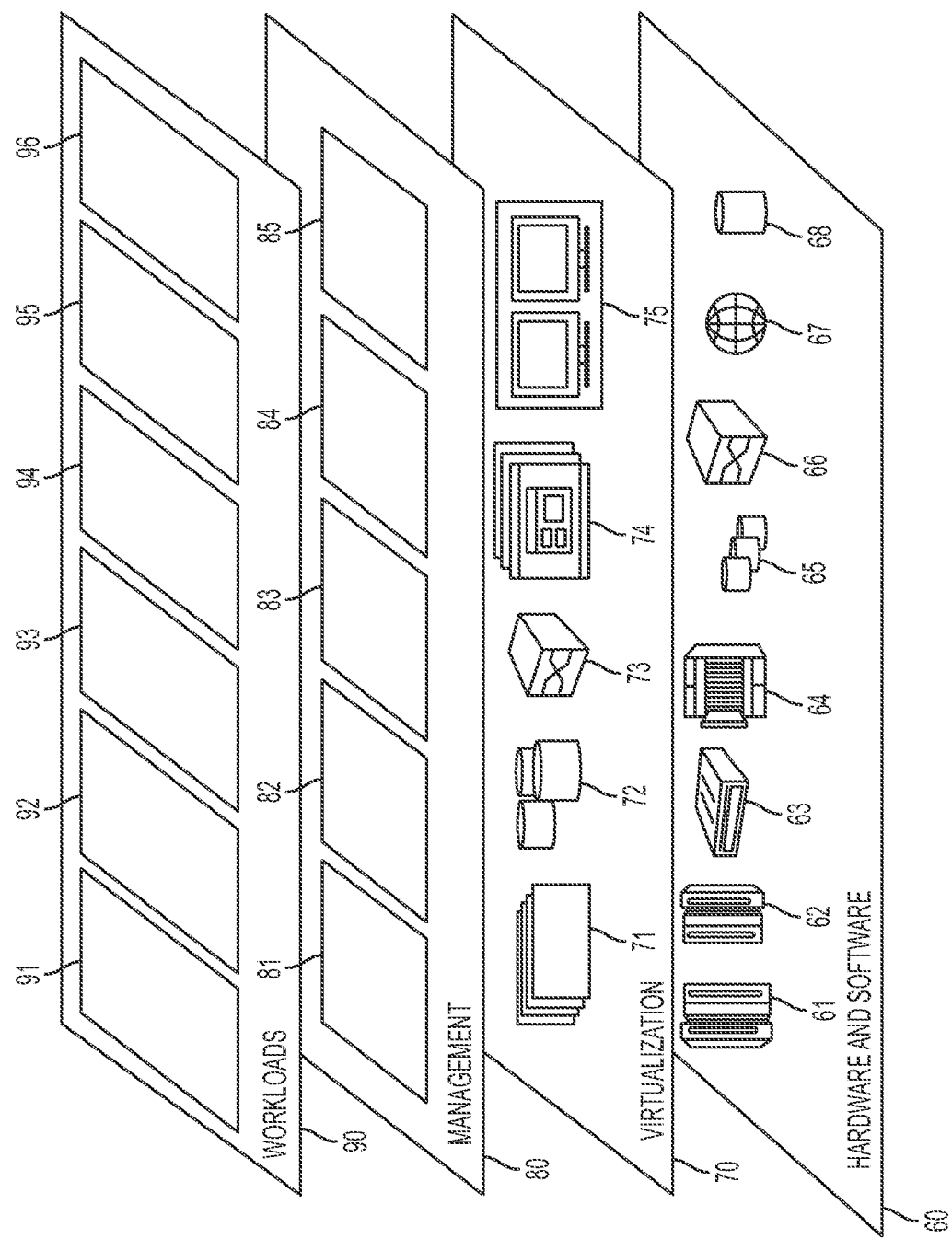
FIG. 7 illustrates a set of functional abstraction layers provided by a cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and improving a digital media content transfer prevention process 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An Internet based digital media content transfer blocking improvement method comprising:
    detecting, by a processor of a detection hardware device, a user request, from a user device for access to digital media content from a digital media provider system;
    detecting, by said processor, said digital media content being transmitted from said digital media provider system to a network;
    detecting, by said processor, a duration and volume of said digital media content being transmitted from said digital media provider system to a network;
    identifying, by said processor executing a network hardware probe of said detection hardware device, network traffic across said network;
    verifying, by said processor executing an analytical software engine of said detection hardware device, that said digital media content is comprised by said network traffic;
    executing, by said processor in response to results of said verifying and said detecting said duration and volume, investigation platform software code;
    querying, by said processor, a database system associated with said digital media provider system;
    determining, by said processor based on results of said querying, if a legitimate connection based relationship exists between said user and said digital media provider system;
    additionally determining, by said processor based on results of monitoring said digital media content, that said digital media content is not authorized for use by said user;
    disabling, by said processor based on said determining that said digital media content is not authorized for use by said user, said digital media content from executing functions with respect to said user device of said user; and
    disabling, by said processor based on said determining that said digital media content is not authorized for use by said user, access to a block chain enabled secure database storing said digital media content.

2. The method of claim 1, wherein said disabling said digital media content comprises:
    blocking, within said detection hardware device, said digital media content from reaching said user device.

3. The method of claim 1, wherein said digital media content comprises encrypted digital media content, and wherein said method further comprises:
    transmitting by said processor to said digital media provider system, a request for providing a decrypt key associated with decrypting said encrypted digital media content for said user device;
    first determining, by said processor, that a specified period of time has elapsed since said transmitting; and
    second determining, by said processor based on results of said first determining, that said decrypt key has not been received by said user device, wherein said disabling said digital media content is based on results of said second determining.

4. The method of claim 1, wherein said disabling said digital media content comprises:
    detecting a location of said user device;
    disabling a network connection to said user device; and
    notifying an authority system that said digital media content is not authorized for use by said user.

5. The method of claim 1, further comprising:
    logging, by said processor, results of said determining that said digital media content is not authorized for use by said user; and
    storing, by said processor in a logging database, log data describing results of said logging.

6. The method of claim 1, wherein said network comprises a structure comprising four independent layers.

7. The method of claim 1, wherein said network hardware probe comprises specialized hardware and software configured to perform said identifying.

8. The method of claim 1, wherein said verifying that said that said digital media content is comprised by said network traffic comprises:
    ingesting said digital media content from said network probe; and
    inspecting said ingested digital media content.

9. The method of claim 1, wherein said digital media content is selected from the group consisting of a digital media stream and a digital media file.

10. The method of claim 1, further comprising:
    determining, by said processor based on results of said monitoring, that said digital media content comprises illicit content, wherein said disabling is further based on said determining that said digital media content comprises illicit content.

11. The method of claim 1, further comprising:
    providing at least one support service for at least one of creating, integrating, hosting, maintaining, and deploying computer-readable code in the control hardware, said code being executed by the computer processor to implement: said detecting said user request, said detecting said digital media content, said identifying, said executing said analytical software engine, said verifying, said executing said investigation platform software code, said querying, said determining, said monitoring, said additionally determining, and said disabling.

12. A computer program product, comprising a computer readable hardware storage device storing a computer readable program code, said computer readable program code comprising an algorithm that when executed by a processor of a detection hardware device implements an Internet based digital media content transfer blocking improvement method, said method comprising:
    detecting, by said processor, a user request from a user device for access to digital media content from a digital media provider system;
    detecting, by said processor, said digital media content being transmitted from said digital media provider system to a network;
    detecting, by said processor, a duration and volume of said digital media content being transmitted from said digital media provider system to a network;
    identifying, by said processor executing a network hardware probe of said detection hardware device, network traffic across said network;
    verifying, by said processor executing an analytical software engine of said detection hardware device, that said digital media content is comprised by said network traffic;
    executing, by said processor in response to results of said verifying and said detecting said duration and volume, investigation platform software code;
    querying, by said processor, a database system associated with said digital media provider system;

determining, by said processor based on results of said querying, if a legitimate connection based relationship exists between said user and said digital media provider system;

additionally determining, by said processor based on results of monitoring said digital media content, that said digital media content is not authorized for use by said user;

disabling, by said processor based on said determining that said digital media content is not authorized for use by said user, said digital media content from executing functions with respect to said user device of said user; and disabling, by said processor based on said determining that said digital media content is not authorized for use by said user, access to a block chain enabled secure database storing said digital media content.

13. The computer program product of claim 12, wherein said disabling said digital media content comprises:

blocking, within said detection hardware device, said digital media content from reaching said user device.

14. The computer program product of claim 12, wherein said digital media content comprises encrypted digital media content, and wherein said method further comprises:

transmitting by said processor to said digital media provider system, a request for providing a decrypt key associated with decrypting said encrypted digital media content for said user device;

first determining, by said processor, that a specified period of time has elapsed since said transmitting; and second determining, by said processor based on results of said first determining, that said decrypt key has not been received by said user device, wherein said disabling said digital media content is based on results of said second determining.

15. The computer program product of claim 12, wherein said disabling said digital media content comprises:

detecting a location of said user device;

disabling a network connection to said user device; and notifying an authority system that said digital media content is not authorized for use by said user.

16. The computer program product of claim 12, wherein said method further comprises:

logging, by said processor, results of said determining that said digital media content is not authorized for use by said user; and storing, by said processor in a logging database, log data describing results of said logging.

17. The computer program product of claim 12, wherein said network comprises a structure comprising four independent layers.

18. The computer program product of claim 12, wherein said network hardware probe comprises specialized hardware and software configured to perform said identifying.

19. The computer program product of claim 12, wherein verifying that said that said digital media content is comprised by said network traffic comprises:

ingesting said digital media content from said network probe; and inspecting said ingested digital media content.

20. A detection hardware device comprising a processor coupled to a computer-readable memory unit, said memory unit comprising instructions that when executed by the computer processor implements an Internet based digital media content transfer blocking improvement method comprising:

detecting, by said processor, a user request, from a user device, for access to digital media content from a digital media provider system;

detecting, by said processor, said digital media content being transmitted from said digital media provider system to a network;

detecting, by said processor, a duration and volume of said digital media content being transmitted from said digital media provider system to a network;

identifying, by said processor executing a network hardware probe of said detection hardware device, network traffic across said network;

verifying, by said processor executing an analytical software engine of said detection hardware device, that said digital media content is comprised by said network traffic;

executing, by said processor in response to results of said verifying and said detecting said duration and volume, investigation platform software code;

querying, by said processor, a database system associated with said digital media provider system;

determining, by said processor based on results of said querying, if a legitimate connection based relationship exists between said user and said digital media provider system;

additionally determining, by said processor based on results of monitoring said digital media content, that said digital media content is not authorized for use by said user;

disabling, by said processor based on said determining that said digital media content is not authorized for use by said user, said digital media content from executing functions with respect to said user device of said user; and disabling, by said processor based on said determining that said digital media content is not authorized for use by said user, access to a block chain enabled secure database storing said digital media content.

* * * * *